UNITED STATES PATENT OFFICE.

EUGENE THEIMER, OF NEWARK, NEW JERSEY, ASSIGNOR TO LOWENSTEIN RADIO COMPANY, INC., OF BROOKLYN, NEW YORK, A CORPORATION OF NEW YORK.

MANUFACTURE OF HYDROBROMIC ACID.

1,379,731.  Specification of Letters Patent.  Patented May 31, 1921.

No Drawing.   Application filed August 4, 1919.   Serial No. 315,311.

*To all whom it may concern:*

Be it known that I, EUGENE THEIMER, a citizen of the United States, residing at Newark, in the county of Essex and State of New Jersey, have invented certain new and useful Improvements in the Manufacture of Hydrobromic Acid; and I do hereby declare the following to be a full, clear, and exact description of the invention, such as will enable others skilled in the art to which it appertains to make and use the same.

This invention relates to the manufacture of hydrobromic acid; and it relates more particularly to the manufacture of concentrated aqueous hydrobromic acid by direct distillation from a suitable mixture of an alkali bromid and a mineral acid under conditions such that the major part of the hydrobromic acid theoretically obtainable from the mixture of reagents can be obtained in the form of an aqueous solution of hydrogen bromid containing upward of 40 per cent. hydrogen bromid and substantially no free bromin.

Concentrated hydrobromic acid, as commercially available in so-called chemically pure form, contains about 48 per cent. of hydrogen bromid and ordinarily contains also more or less free bromin. Heretofore difficulty has been experienced in obtaining hydrobromic acid of this concentration and, in general, of concentrations exceeding say 30 per cent. HBr; and it has been especially difficult to obtain such acid containing no free bromin, or other objectionable impurity such as sulfurous acid. So far as I am aware, concentrated hydrobromic acid heretofore obtainable on the market has been prepared by processes involving redistillation and concentration of relatively dilute hydrobromic acid, which dilute hydrobromic acid may have been prepared in any one of various ways heretofore known. Such redistillation and concentration have been necessitated by the fact that, by any of the methods heretofore proposed for making hydrobromic acid, the hydrobromic acid as first obtained has been either too dilute or has contained a considerable amount of free bromin from which the crude hydrobromic acid had to be freed as far as possible. It has also been proposed to prepare hydrobromic acid by reacting upon dry potassium bromid with sulfuric acid of various concentrations ranging from very dilute to concentrated acid of 1.84 specific gravity. By none of these methods has it been possible to produce pure concentrated hydrobromic acid directly and without further treatment following the first distillation.

I have discovered that an almost theoretically quantitative yield of substantially chemically pure aqueous hydrobromic acid ranging from 40 to 48 per cent. HBr content, can be obtained directly by a single distillation from a properly prepared and proportioned mixture of a bromid with a suitable mineral acid. In particular, I have succeeded in attaining this result in an especially satisfactory manner with the use of sodium bromid and sulfuric acid as the specific reagents, employed in the form of separate solutions of relatively high strength which are brought together to form the reaction mixture; and the manufacture of hydrobromic acid with these specific reagents in accordance with the invention will therefore be hereinafter described in detail, not by way of limitation but for the sake of illustrating one particularly desirable mode of practising the invention.

In an especially desirable specific embodiment of the broad principles of the invention, I may proceed as follows: 103 lbs. of sodium bromid (NaBr, water-free) is dissolved in 90.5 lbs. of warm water, and with this substantially saturated solution is mixed 126 lbs. of 60° B. sulfuric acid (78% $H_2SO_4$). Upon heating the mixture carefully in a suitable retort, pure hydrobromic acid of 48 per cent. strength first distils over, becoming weaker very gradually. About two-thirds of the total yield, which is almost theoretical, distils over 45 per cent. strong, the whole distillate averaging around 41–42 per cent. The last portion is the weakest. The bulk of the distillate comes over when the liquid mixture is at 130°–140° C., the final temperature being about 160°–170° C. The strong hydrobromic acid thus obtained is of high purity, is free of bromin and sulfurous acid, and requires no redistillation or other purifying treatment.

The specific quantities of reagents and concentrations given in the foregoing illustrative example are not fixed, of course, but the proportions therein stated yield the best results in actual practice and are therefore to be especially recommended. It will be noted that the proportions of the reagents conform approximately to the requirements of the equation $$NaBr + H_2SO_4 = HBr + NaHSO_4$$

since 126 lbs. of 60° B. sulfuric acid contain substantially 98 lbs. $H_2SO_4$. In general it is advisable to employ the reagents in these reacting proportions, though the invention is not limited to the use of said proportions. The reaction mixture in the foregoing example contains at the start, the approximate equivalent of—

103 lbs. NaBr,
98 lbs. $H_2SO_4$ (100%),
118.5 lbs. $H_2O$.

Not only is it desirable to employ the above reacting proportions of NaBr and $H_2SO_4$, but the proportion of water present, that is the degree of concentration, is also of great importance, the concentration above specified giving the best results in actual practice. If more water is used, the distillate is weaker at first. If less water is used, the first part of the HBr comes over as gas, thus reducing the yield of aqueous acid directly obtainable. The same thing happens if an excess of sulfuric acid over the theoretical is used, while using the amount of water above specified; and more water should then be added to get the most desirable concentration.

The strength of the sulfuric acid mixed with the concentrated sodium bromid solution may also be varied somewhat, but in such case the amount of water used for dissolving the sodium bromid should be varied accordingly, where it is desired to operate under optimum conditions. For practical purposes, it is most convenient to use 60° B. sulfuric acid since this is a commercial strength and since mixing acid of much greater strength with sodium bromid solution is apt to generate so much heat as to cause trouble in some instances. Sulfuric acid somewhat weaker than 60° B. may be used, but for carrying out the process efficiently it is usually inadvisable to use acid of less than say 50° B. strength because in mixing with an equivalent amount of dissolved sodium bromid, a mixture which is too dilute for best results is obtained. In actual practice, it is preferable that sulfuric acid of at least 55° B. be used where it is desired that the total distillate average as high as 40 per cent. HBr.

Instead of using water-free sodium bromid, I may of course use the crystal form, $NaBr.2H_2O$, having a molecular weight of 139; in which case, 139 lbs. of the crystals are dissolved in 54.5 lbs of water to obtain a sodium bromid solution having the same concentration as in the specific example first above given.

From the foregoing it will be seen that while, for most efficient operation and most satisfactory results, it is desirable to proceed substantially as in the specific example first above given for purposes of illustration, nevertheless the invention is not limited to such procedure, which may be varied considerably in details while at the same time realizing, to some extent at least, the benefits of the broad invention.

What I claim is:

1. In the manufacture of hydrobromic acid, the process which comprises bringing together into reacting relation a relatively concentrated solution of a soluble bromid and a relatively concentrated mineral acid, heating the resultant mixture to distilling temperature, and collecting a distillate consisting of strong aqueous hydrobromic acid containing substantially no free bromin.

2. In the manufacture of hydrobromic acid, the process which comprises bringing together into reacting relation a relatively concentrated solution of a soluble bromid and sulfuric acid of not less than about 50° B., heating the resultant mixture to distilling temperature, and collecting a distillate consisting of aqueous hydrobromic acid, of at least about 40 per cent. strength and containing substantially no sulfurous acid or free bromin.

3. In the manufacture of hydrobromic acid, the process which comprises bringing together into reacting relation a relatively concentrated solution of a soluble bromid and sulfuric acid of not less than about 50° B. in proportions such that hydrobromic acid and an acid sulfate will be formed, heating the mixture to distilling temperature, and collecting a distillate consisting of substantially pure aqueous hydrobromic acid of at least about 40 per cent. strength.

4. In the manufacture of hydrobromic acid, the process which comprises commingling a strong aqueous solution of an alkali bromid with strong sulfuric acid of from about 50° to 60° B. gravity, and distilling the mixture to obtain therefrom most of the theoretically obtainable hydrogen bromid as aqueous hydrobromic acid of at least about 40 per cent. strength and containing substantially no free bromin.

5. In the manufacture of hydrobromic acid, the process which comprises mixing a concentrated solution of a bromid and sulfuric acid of at least 50° Baumé, and distilling the mixture.

6. In the manufacture of hydrobromic acid, the process which comprises commingling a substantially saturated aqueous solution of sodium bromid with sulfuric acid of about 60° Baumé, in proper proportions to form hydrobromic acid and sodium bisulfate, and distilling the mixture.

7. In the manufacture of hydrobromic acid, the process which comprises commingling sulfuric acid and an aqueous solution of sodium bromid in proportions and concentrations giving the equivalent of an initial reaction mixture containing approximately 103 parts NaBr, 98 parts $H_2SO_4$, and 118.5 parts water, all parts by weight, and distilling the mixture.

8. In the manufacture of hydrobromic acid, the process which comprises preparing a mixture by interacting between approximately equal parts by weight of sodium bromid and $H_2SO_4$ in the presence of slightly more than one part by weight of water, and distilling aqueous hydrobromic acid of at least about 40 per cent. strength therefrom.

9. In the manufacture of hydrobromic acid, the process which comprises commingling a concentrated solution of sodium bromid with sulfuric acid of about 55°–60° B. gravity, and distilling strong aqueous hydrobromic acid from the mixture.

In testimony whereof I hereunto affix my signature.

EUGENE THEIMER.